United States Patent
Maki et al.

(10) Patent No.: US 9,643,370 B2
(45) Date of Patent: May 9, 2017

(54) SYSTEM AND METHOD FOR PRE-STRETCHING A PREFORM

(71) Applicant: Discma AG, Hunenberg (CH)

(72) Inventors: Kirk Edward Maki, Tecumseh, MI (US); George David Lisch, Jackson, MI (US); Bradley Wilson, Manchester, MI (US); Luke A. Mast, Brooklyn, MI (US)

(73) Assignee: DISCMA AG, Hunenberg (CH)

( * ) Notice: Subject to any disclaimer, the term of this patent is extended or adjusted under 35 U.S.C. 154(b) by 850 days.

(21) Appl. No.: 13/723,233

(22) Filed: Dec. 21, 2012

(65) Prior Publication Data

US 2013/0161878 A1    Jun. 27, 2013

Related U.S. Application Data

(60) Provisional application No. 61/579,010, filed on Dec. 22, 2011.

(51) Int. Cl.
*B29C 49/12*    (2006.01)
*B29D 22/00*    (2006.01)
(Continued)

(52) U.S. Cl.
CPC ............ *B29D 22/003* (2013.01); *B29C 49/12* (2013.01); *B29C 49/68* (2013.01); *B29C 49/06* (2013.01);
(Continued)

(58) Field of Classification Search
USPC ....................................................... 264/532
See application file for complete search history.

(56) References Cited

U.S. PATENT DOCUMENTS

| 3,944,645 A * | 3/1976 | Farrell | B29C 49/063 |
| | | | 264/237 |
| 2010/0159056 A1* | 6/2010 | Toutoux | B29C 49/12 |
| | | | 425/150 |

(Continued)

FOREIGN PATENT DOCUMENTS

JP    6-55418 B2    7/1994
JP    2008-12737 A    1/2008

OTHER PUBLICATIONS

International Search Report of PCT/IB2012/003010, Mailed Sep. 17, 2013, 2 pages.

(Continued)

*Primary Examiner* — Jacob Thomas Minskey
(74) *Attorney, Agent, or Firm* — Eric J. Sosenko; Jonathan P. O'Brien; Honigman Miller Schwartz and Cohn LLP

(57) ABSTRACT

A system for pre-stretching a preform utilized in forming a container. The system including an oven, a conveyor system configured for transporting preforms through the oven a blow molding station having at least one mold with interior surfaces defining the shape of the container, and a transfer station configured to transfer a preform from the oven into the blow molding station. The system also includes a stretch rod and an actuator. The stretch rod is movable between retracted and extended positions such that, when in the extended position, the stretch rod is positioned interiorly of the preform and the preform is elongated by the stretch rod to form a pre-stretched preform. The stretch rod is located to form the pre-stretched preform prior to the blowing medium being introduced into the preform in the blow molding station.

23 Claims, 3 Drawing Sheets

(51) Int. Cl.
*B29C 49/68* (2006.01)
*B29C 49/06* (2006.01)
*B29C 49/42* (2006.01)
*B29C 49/64* (2006.01)
*B29C 49/46* (2006.01)

(52) U.S. Cl.
CPC ...... *B29C 49/4205* (2013.01); *B29C 49/6418* (2013.01); *B29C 2049/1257* (2013.01); *B29C 2049/1261* (2013.01); *B29C 2049/465* (2013.01)

(56) References Cited

U.S. PATENT DOCUMENTS

| | | |
|---|---|---|
| 2010/0213629 A1 | 8/2010 | Adriansens |
| 2010/0237545 A1 | 9/2010 | Haury et al. |
| 2011/0024953 A1* | 2/2011 | Winzinger .................. 264/531 |
| 2011/0135778 A1 | 6/2011 | Andison et al. |
| 2011/0260373 A1 | 10/2011 | Finger et al. |

OTHER PUBLICATIONS

International Search Report of PCT/IB2012/003010, Mailed on Sep. 17, 2013, 5 pages.

* cited by examiner

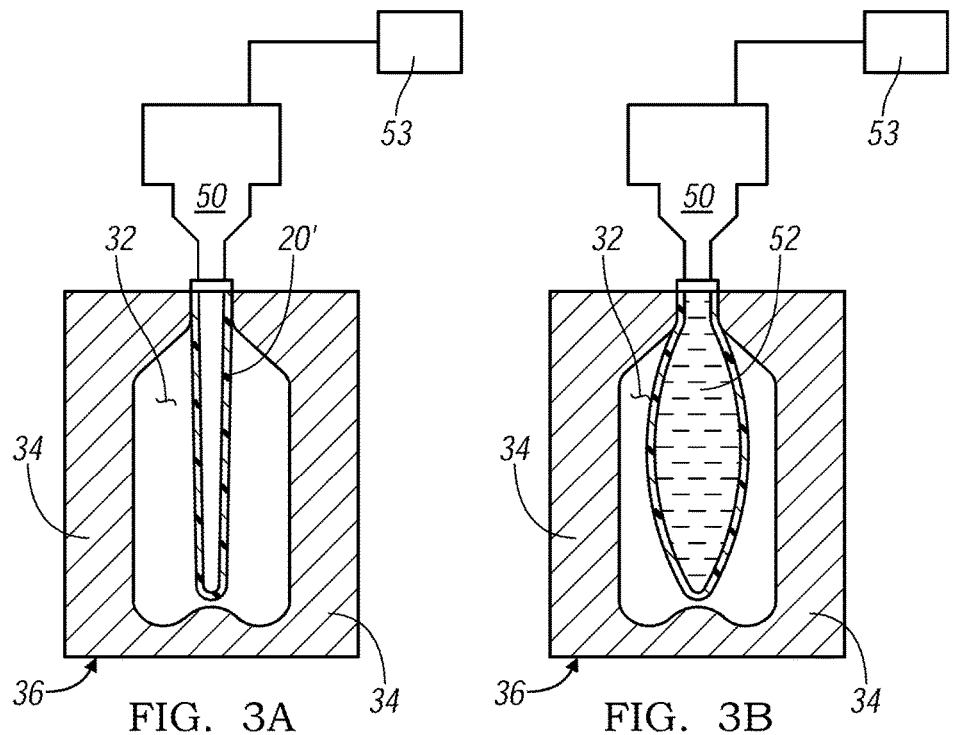
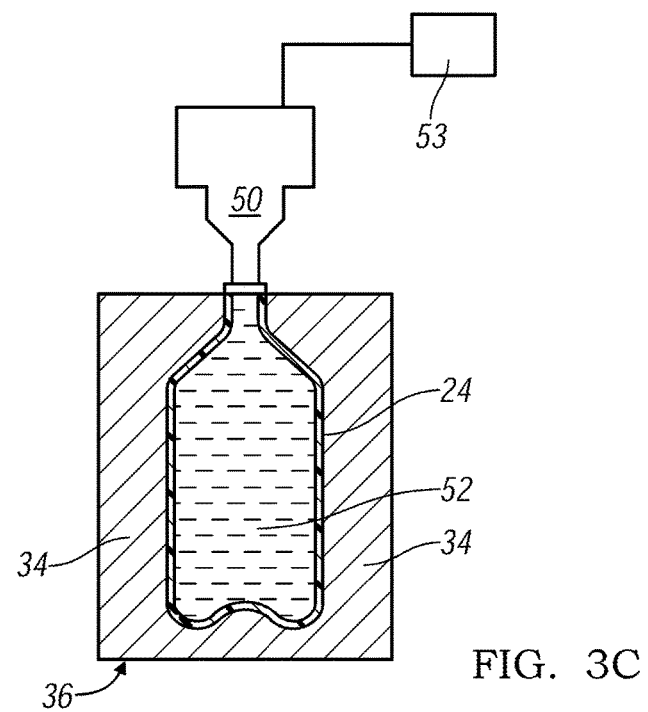
FIG. 3A  FIG. 3B  FIG. 3C

SYSTEM AND METHOD FOR PRE-STRETCHING A PREFORM

CROSS REFERENCE TO RELATED APPLICATION

This application is a nonprovisional application and claims the benefit of provisional patent application No. 61/579,010, filed on Dec. 22, 2011, the entire contents of which are hereby incorporated by reference.

BACKGROUND

1. Field of the Invention

The present invention generally relates to the blow molding of containers for liquid and viscous products.

2. Description of Related Art

Plastic containers are commonly used for the packaging of various products, including liquid products and viscous product. One of the most common forms of plastic container is the blow molded plastic container, which are often formed of polyester materials and, more specifically, polyethylene terephthalate (PET). Blow molded plastic containers are typically formed by placing a heated preform into a blow mold and then inflating the preform with air until the preform contacts the interior surfaces of the mold cavity, which define the final shape of the desired container. Once the inflated preform has been held against the interior surfaces of the mold cavity by the pressure of the blow air for a length of time sufficient to "freeze" the plastic, the molded container is removed from the mold.

The molded containers then transported to the location where the container will be filled with the intended product and labeled. This may include the packaging and shipping of the container to a remote location or may involve the transfer of the container to a local facility where these final steps occur before the finished product is shipped to a retailer or end-user.

With the above method, blow molding and filling are distinct and separate steps in the process of producing a product filled container. A newer process involves the use of the product itself in the blow molding of the container. Instead of utilizing air as the blowing medium, this new process utilizes the liquid or viscous product that is to be contained within the container as the blowing medium. As used herein, this type of blow molding is referred to as hydraulic blow molding.

In traditional blow molding, after the heated preform has been introduced into the mold cavity, a stretch rod is often advanced within the preform to longitudinally stretch the preform before any significant radial expansion of the preform is undertaken. The stretch rod will typically remain within the preform during radial expansion, and is retracted prior to removal of the resultant container.

One concern of hydraulic blow molding is the contamination of the interior of the preform since product is immediately introduced into the preform. If a stretch rod is located within the interior of a preform or partially formed container and in contact with the product, there is a concern that residual product on the stretch rod may become contaminated over time. Additionally, there is the possibility that residual product on the stretch rod may be at a temperature different from that of product introduced during the hydraulic blow molding of the container and that initial contact of this residual product with the preform may result in a local portion of the preform being less susceptible to molding during the hydraulic blow molding step.

SUMMARY

In satisfying the above need, as well as overcoming the enumerated drawbacks and other limitations of the related art, in one aspect the present invention provides a system for pre-stretching a preform utilized in forming a container. The system including an oven having a plurality of heating devices configured to direct heat toward preforms passing through the oven, the oven further having a passageway defined therethrough and the plurality of heating devices being positioned on opposing sides of the passageway; a conveyor system configured for transporting preforms through the oven along the passageway, the conveyor system including a plurality of carrier assemblies coupled to one another by a conveyor, the conveyor being connected to a drive mechanism whereby the carrier assemblies are continuously moved through the oven during operation thereof, each of the carrier assemblies having a mounting portion configured to engage and retain a preform therewith; a blow molding station having at least one mold with interior surfaces defining the shape of the container, the blow molding station including at least one blow nozzle coupled to a source of blowing medium, wherein the blow molding station is configured to blow mold the container from the preform within the mold by the blowing medium; a transfer station configured to transfer a preform from the oven into the blow molding station; and a stretch rod and an actuator coupled to the stretch rod, the stretch rod being movable between retracted and extended positions by the actuator, the stretch rod further being located such that when in the extended position the stretch rod is positioned interiorly of the preform whereby the preform is elongated by the stretch rod to form a pre-stretched preform, the stretch rod also being located such that in the retracted position the stretch rod is not positioned interiorly of the preform, the stretch rod further being located to engage the preform and form the pre-stretched preform prior to the blowing medium being introduced into the preform in the blow molding station.

In another aspect of the invention, the stretch rod is located so as to engage the preform and form the pre-stretched preform prior to the transfer station transferring the preform into the mold of the blow molding station.

In a further aspect of the invention, the stretch rod is located so as to be in the extended position when the preform is within the oven.

In an additional aspect of the invention, the stretch rod is configured form the pre-stretched preform prior to the preform exiting the oven.

In yet another aspect of the invention, the stretch rod is located so as to be in the extended position when the preform is in the transfer station.

In still a further aspect of the invention, the stretch rod passes through a bore centrally located within the carrier assembly.

In an additional aspect of the invention, the stretch rod is movable with the conveyor.

In another aspect of the invention, the actuator is one of a pneumatic actuator, the hydraulic actuator and a mechanical actuator.

In a further aspect of the invention, the oven includes a plurality of heating zones, the heating devices being positioned in different positions relative to a preform passing therethrough at least two of the plurality of heating zones.

In still an additional aspect of the invention, the blow molding station is a hydraulic blow molding station.

In yet a further aspect of the invention, the blowing medium is a non-gaseous medium.

In another aspect of the invention, the transfer station is configured to transfer a pre-stretched preform into the mold of the blow molding station.

In still another aspect of the invention, a standoff medium supply is configured to introduce a standoff medium into the preform as the stretch rod is being moved from the retracted position to the extended position.

In another aspect, the invention provides a method of pre-stretching a preform and forming a container therefrom, the method comprising the steps of: providing an elongated preform having a finish portion and a body portion; moving the preform through an oven having a plurality of heating devices located on opposite sides of a passageway through the oven; heating the preformed to form a heated preform; transferring the heated preform from the oven to a blow molding station; introducing a blowing medium into the heated preform to form a container when the heated preform is in a blow mold of the blow molding station; and advancing a stretch rod from a retracted position to an extended position so as to cause elongation of the preform and formation of a pre-stretched preform, wherein the pre-stretched preform the heated preform in the introducing step, the advancing step being performed prior to the introducing step.

In a further aspect of the invention, the advancing step advances the stretch rod from the retracted position when the preform is within the oven.

In yet another aspect of the invention, the advancing step advances the stretch rod to the extended position when the preform is within the oven.

In a still further aspect of the invention, the advancing step advances the stretch rod from the retracted position after the preform has exited the oven.

In an additional aspect of the invention, the advancing step advances the stretch rod to the extended position after the preform has exited the oven.

Yet another aspect of the invention, the advancing step advances the stretch rod to the extended position prior to the preform being transferred into the blow molding station.

In a further aspect of the invention, the blowing medium is a non-gaseous medium, whereby blow molding of the container is by hydraulic blow molding.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3A-3C illustrates the process of hydraulically blow molding a pre-stretched preform into a formed and filled container.

DETAILED DESCRIPTION

Figure 1:
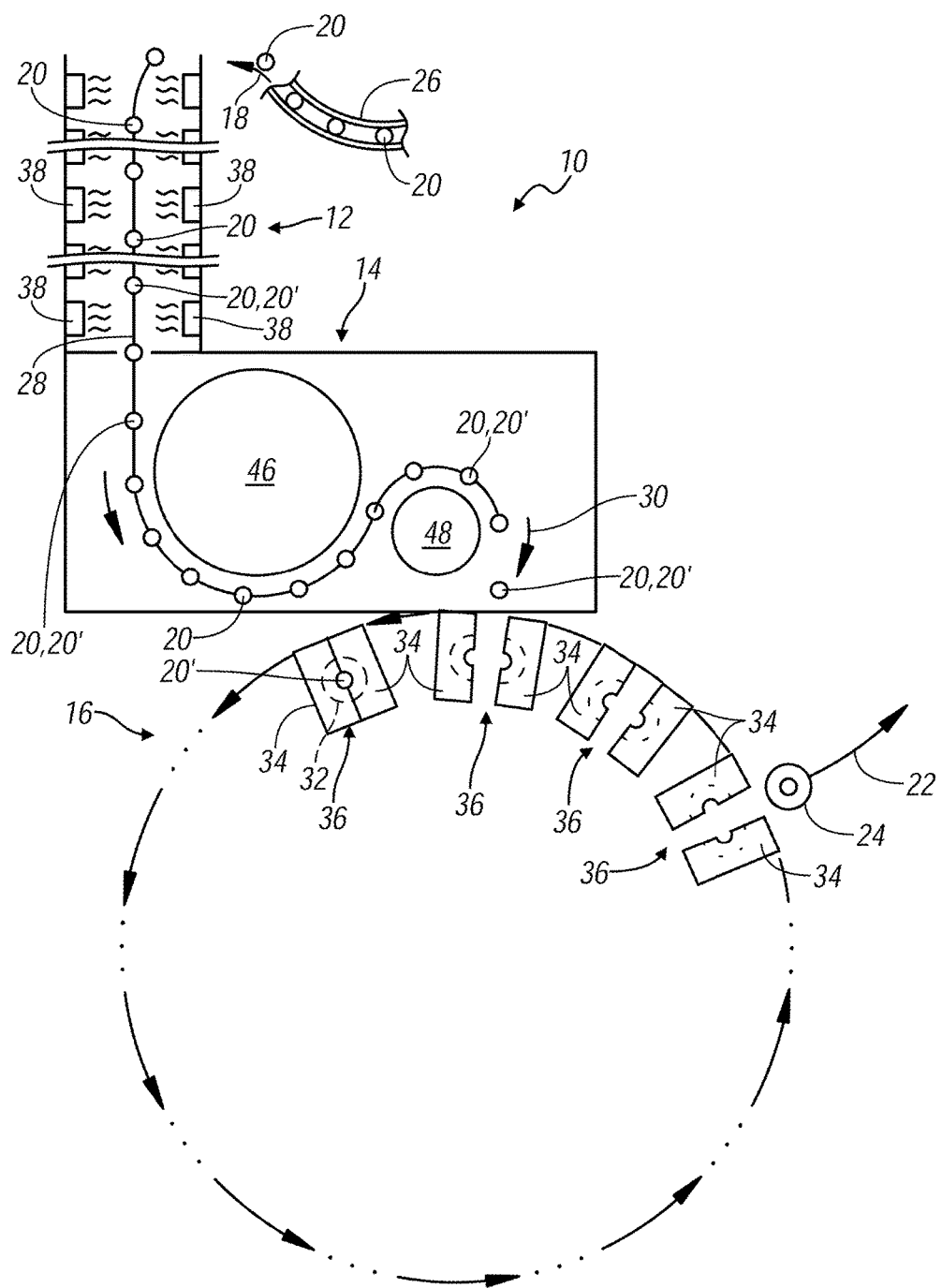
FIG. 1 schematic illustration of a blow molding system incorporating the principles of the present invention.

Referring now to the drawings, a hydraulic blow molding system embodying the principles of the present invention is generally illustrated in FIG. 1 and designated at 10. As its primary components, the system 10 includes an oven or heating station 12, a transfer station 14 and a hydraulic blow molding station 16. Additionally, the system 10 includes an in-feed station 18 for introducing preforms 20 into the oven 12 and an out-feed station 22 for removing formed and filled containers 24 from the hydraulic blow molding station 16.

Generally, preforms 20 are provided to the system 10 at the in-feed station 18 by way of a rail or other transport mechanism 26. The preforms 20 are then individually placed onto a conveyor 28, which transports the preforms 20 through the oven 12 and the transfer station 14 to a mold loading station 30. At the mold loading station 30, the preforms 20 are then placed within a mold cavity 32 that is defined by opposing mold halves 34 of a mold assembly 36. While a plurality of mold assemblies 36 are provided at the hydraulic blow molding station 16, the actual number of mold assemblies 36 in the hydraulic blow molding station 16 can and will vary depending on the specific design and type of the hydraulic blow molding station 16. For example, in a rotary, hydraulic blow molding station of the type generally represented in the illustration of FIG. 1, the number of mold assemblies may range anywhere from four to forty, or more.

The oven 12 includes a plurality of heaters 38 spaced along the length of the oven 12. The heaters 38 heat the material of the preforms 20 to a point where they are susceptible to hydraulic blow molding. The oven 12 itself may include separate sub-zones. Such sub-zones may include an initial heating zone 40 generally at the entrance of the oven 12, a heat soak or main heating zone 42, and a final heating zone 44 just prior to the location where the preforms 20 exit the oven 12.

The heaters 38 are spaced longitudinally along the length of the oven in the various zones so as to introduce into the preforms 20 a desired heat profile that will allow for optimization of the distribution of the plastic material during the remaining steps in the pre-stretch and blow molding process. The heat profile may vary or define a gradient over the longitudinal length of the preforms 20. Alternatively, the heat profile may be constant over the length of the preforms 20. Additionally, the heat profile may vary across the thickness of the preforms with, for example, the material on the exterior of the preform 20 being at a higher temperature than the material on the interior of the preform. The actual heat profile will depend on the specific design of the preform 20, including its shape and material composition, and the design of the container 24 to be formed.

Figure 2:
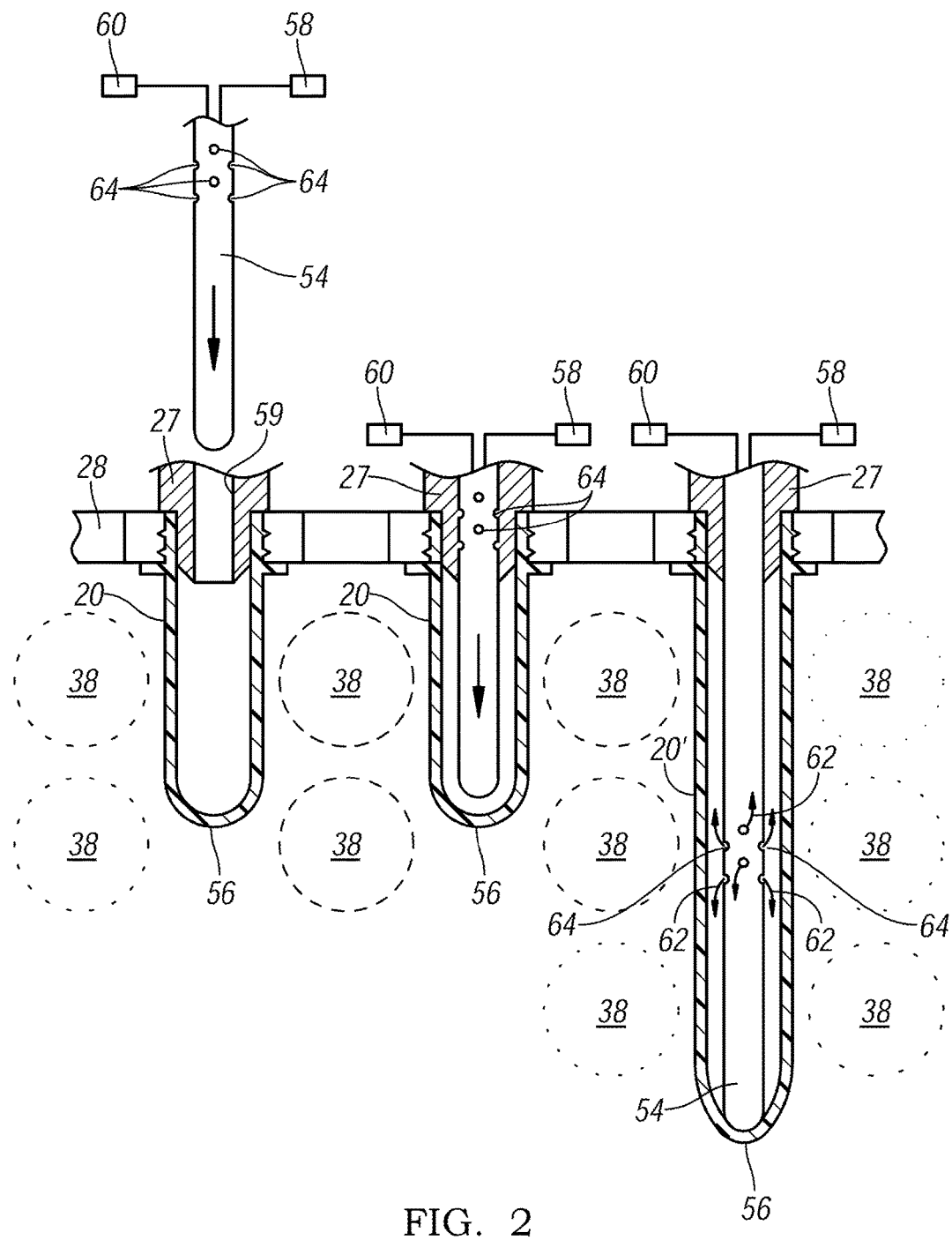
FIG. 2 is an enlarged view of threw preforms proceeding through the system of FIG. 1 and showing one preform prior to pre-stretching, another preform at the initiation of pre-stretching, and a third preform during or after pre-stretching.

In order to introduce the proper heat profile into the preforms 20, the number and spacing of the heaters 38 can vary along the length of the oven 12. As seen in FIG. 2, the number of heaters 38 that are designated as being optionally present, at a given location, vary along the length of the oven 12. More specifically, the number of heaters 30 present along the length of the oven 12 increases and are provided over a greater vertical height of the oven 12 in the main and final heating zones 42, 44 as opposed to the initial heating zone 40.

As noted above, the heaters 38 are designated as being optional in FIG. 2 since this figure is intended to depict the preforms 20 during pre-stretching, which can occur at various stages of production, and which is further discussed below.

From the oven 12, the heated preforms 20 are transferred by the transfer station 14 to the hydraulic blow molding station 16. Various configurations can be envisioned for the transfer station 14, including the use of mechanisms such transfer arms, transfer wheels, a combination of these or other mechanisms. In the illustrated configuration, the transfer station 14 utilizes a primary transfer wheel 46 coupled to the conveyor 28 to receive the preforms from the oven 12. A secondary transfer wheel 48 is also used, in conjunction with the primary transfer wheel 46, to position and facilitate transferring of the heated preforms 20 into the mold cavity 32 of the mold halves 34 at the mold loading station 30. In the mold loading station 30 a slide actuator or robotic arm (not shown) may be used to facilitate the transfer from the conveyor 28 into the mold cavity 32. Since such transfer mechanisms are known in the field of blow molding, further details of these mechanisms is not described herein.

Referring now to FIGS. 3A-3C, once the heated preform is positioned between the of the mold assembly 36, an actuator (not shown) closes the mold halves about the heated preform, which preferably has been pre-stretched as further discussed below, thereby entrapping the heated preform within the mold cavity 32. In the blow molding station 16, a nozzle assembly 50 is brought into engagement with the finish of the preform 20 and a blowing medium 52 is introduced under pressure into the preform 20 to radially expand the preform 20 into conformity with the interior surfaces of the mold cavity 32, thereby molding the preform 20 into the shape of the container 24 while simultaneously filling the container 24.

In that the blow molding process is conducted by way of hydraulic blow molding the blowing medium 52 is a non-gaseous medium and is the actual liquid or viscous product that is being packaged within the container 24. To facilitate this process, the blowing medium 52 is provided from a product source 53 coupled to the nozzle assembly 50. As will be appreciated, with this process, the container 24 is simultaneously blow molded and filled with product.

After an appropriate time in contact with the interior surfaces of the mold cavity 32, the mold halves 34 open and the formed and filled container 24 is removed from the mold assembly 36 at the out-feed station 22. The transfer of the formed and filled container 24 from the mold assembly 36 at the out-feed station 22 is performed by another transfer mechanism, such as a robotic arm or slide actuator. Again, such transfer mechanisms are known in the blow molding industry and not further discussed herein.

After the out-feed station 22, the formed and filled container 24 is transferred to a sealing/capping station (not shown) where a seal, a cap or both are applied. At this point, the filled and capped container 24 may be subsequently transferred to a labeling station (not shown) where labeling is applied.

Prior to the introduction of the blowing medium 52 into the preform in the hydraulic blow molding station 16, the preform 20 is subjected to pre-stretching. As used herein, pre-stretching is used to mean that the preform is stretched by a stretch rod and the stretch rod withdrawn before introduction of the blowing medium. Pre-stretching is conducted to avoid having the mechanism used for stretching the preform 20 come into contact with the blowing medium 52. If the stretching mechanism, the stretch rod for example, does come into contact with the blowing medium 52, the system has an increased risk for contamination of the filling product (the blowing medium 52) and an increased risk that residual product on the stretching mechanism will come into contact with another preform 20 prior to introduction of the blowing medium 52, resulting in possible improper inflation of the preform 20 and formation of the container 24. To alleviate these potential drawbacks, the present system 10 conducts pre-stretching prior to the introduction of the blowing medium 52 into the preform.

As seen in FIG. 2, a mechanism for facilitating pre-stretching of the preform 20 utilizes a stretch rod 54 that is movable between a retracted position and an extended position. The retracted position of the stretch rod 54 is seen on the left side of FIG. 2 where, in the fully retracted position, the stretch rod 54 is completely withdrawn from the interior of the preform 20. The extended position of the stretch rod 54 is shown on the right side of FIG. 2. In the fully extended position, the stretch rod 54 is located within the interior of the preform 20, has engaged the closed end 56 and has fully elongated the preform 20. After the stretch rod 54 has been extended to its fully extended position, the preform 20 defines a pre-stretched preform 20'.

As previously noted, prior to pre-stretching the preform 20, the preform 20 is heated by the heaters 38 as it is passes through the oven 12. Once the material of the preform 20 is appropriately heated, the stretch rod 54 is caused to be moved, by an actuator 58, from its retracted position to its extended position, through a central bore 59 formed in the carrier assembly 27. The actuator 58 may be one of a variety of types of actuators used to cause advancement and withdrawal of a stretch rod or other member. As such, the actuator 58 may be a pneumatic actuator, a hydraulic actuator, a mechanical actuator or another type of actuator. In terms of mechanical actuators, the actuator may be motor driven or may employ the interaction of cam surfaces to cause the advancement and withdraw of the stretch rod 54.

As seen in FIG. 2, the stretch rod 54 progresses from its retracted position, to a partially extended position, and finally to a fully extended position. This movement of the stretch rod 54 from the retracted position through the partially extended position and into the fully extended position is preferably done in a continuous movement. During this movement, standoff air may be provided from an air source 60 to prevent the preform 20 from collapsing against the stretch rod 54 during elongation. The standoff air, designated at 62 on the right side of FIG. 2, can be provided through air ports 64 formed in the stretch rod 54. In such an instance, the stretch rod 54 is coupled to the air source 60. Alternatively, the standoff air can be ported through the mechanism, such as the carrier assembly 27, securing the preform 20 to the conveyor 28.

FIG. 2 suggests the stretch rod 54 as operating within the oven 12, which is optionally indicated by the presence of the heaters 38 designated in phantom in the figure. It should be noted, however, that pre-stretching of the preform 20 is not intended to be restricted to occurring the oven 12. As such, the presence of the heaters 38 in FIG. 2, wholly or partially, is optional. By omitting consideration of the heaters 38 in the figure, the figure represents the positioning and operation of the stretch rod 54 in a location outside of and downstream of the oven 12. In such an instance, the stretch rod 54 may be operated at a location wholly within the transfer station 14 or partially within the oven 12 and partially within the transfer station 14. In a further embodiment, the location operation of the stretch rod 54 may occur least partially within the mold cavity 32. In such an instance, the stretch rod 54 is fully withdrawn from its extended position and sealed off prior to the introduction of the blowing medium 52. Preferably, however, the stretch rod 54 and its operation are located and performed upstream of the blow molding station 16. As a result, the pre-stretched preform 20' is transferred into the mold cavity 32 at the mold loading station 30.

With the above system and method, the prospect of contamination of the product and improper molding of the container as a result of residual blowing medium on the stretch rod is minimized.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A system for pre-stretching a preform utilized in forming a container, the system comprising:
    an oven having a plurality of heating devices configured to direct heat toward preforms passing through the oven, the oven further having a passageway defined therethrough; and
    a conveyor system configured to transport the preforms through the oven along the passageway, the conveyor system including a plurality of carrier assemblies coupled to one another by a conveyor, the conveyor being connected to a drive mechanism whereby the carrier assemblies are continuously moved through the oven during operation thereof, each of the carrier assemblies having a mounting portion configured to engage and retain a preform therewith;
    a blow molding station having at least one mold with interior surfaces defining the shape of the container, the blow molding station including at least one blow nozzle coupled to a source of blowing medium, the blow molding station being a hydraulic blow molding station wherein the blowing medium is a non-gaseous blowing medium, wherein the blow molding station is configured to blow mold the preform within the mold into the container with the blowing medium;
    a transfer station configured to transfer a preform from the oven into the blow molding station; and
    a stretch rod, the stretch rod being movable between retracted and extended positions by an actuator coupled thereto, in the extended position the stretch rod is positioned interiorly of the preform whereby the preform is elongated by the stretch rod to form a pre-stretched preform, in the retracted position the stretch rod is not positioned interiorly of the preform, the stretch rod further being located relative to the oven, the transfer station and the blow molding station to engage the preform and form the pre-stretched preform prior to the blowing medium being introduced into the preform in the blow molding station and to be in the retracted position prior to the blow molding medium being introduced into the pre-stretched preform.

2. The system for pre-stretching a preform according to claim 1, wherein the stretch rod is located so as to engage the preform and form the pre-stretched preform prior to the transfer station transferring the preform into the blow mold of the blow molding station.

3. The system for pre-stretching a preform according to claim 1, wherein the stretch rod is located so as to be in the extended position when the preform is within the oven.

4. The system for pre-stretching a preform according to claim 3, wherein the stretch rod is configured to form the pre-stretched preform prior to the preform exiting the oven.

5. The system for pre-stretching a preform according to claim 1, wherein the stretch rod is located so as to be in the extended position when the preform is in the transfer station.

6. The system for pre-stretching a preform according to claim 1, wherein the stretch rod passes through a bore centrally located within the carrier assembly.

7. The system for pre-stretching a preform according to claim 1, wherein the stretch rod is movable with the conveyor.

8. The system for pre-stretching a preform according to claim 7, wherein the actuator is one of a pneumatic actuator, the hydraulic actuator and a mechanical actuator.

9. The system for pre-stretching a preform according to claim 1, wherein the oven includes a plurality of heating zones, the heating devices being positioned in different positions relative to a preform passing therethrough at least two of the plurality of heating zones.

10. The system for pre-stretching a preform according to claim 1, wherein the transfer station is configured to transfer a pre-stretched preform into the mold of the blow molding station.

11. The system for pre-stretching a preform according to claim 1, wherein a standoff medium supply is configured to introduce a standoff medium into the preform as the stretch rod is being moved from the retracted position to the extended position.

12. The system for pre-stretching a preform according to claim 1, wherein the stretch rod is further arranged such that the stretch rod is at least partially operable within the mold cavity.

13. A method of pre-stretching a preform and forming a container therefrom, the method comprising the steps of:
    providing an elongated preform having a finish portion and a body portion;
    moving the preform through an oven having a plurality of heating devices;
    heating the preform to form a heated preform;
    transferring the heated preform from the oven to a blow molding station;
    introducing a blowing medium into the heated preform to form a container when the heated preform is in a blow mold of the blow molding station, the blowing medium being a non-gaseous medium whereby blow molding of the container is by hydraulic blow molding; and
    advancing a stretch rod from a retracted position to an extended position so as to cause elongation of the heated preform and formation of the pre-stretched preform, wherein the pre-stretched preform is the heated preform in the introducing step; and
    retracting and maintaining the stretch rod completely out of the pre-stretched preform prior to and during the introducing step.

14. The method of pre-stretching a preform according to claim 13, wherein the advancing step advances the stretch rod from the retracted position when the preform is within the oven.

15. The method of pre-stretching a preform according to claim 13, wherein the advancing step advances the stretch rod to the extended position when the preform is within the oven.

16. The method of pre-stretching a preform according to claim 13, wherein the advancing step advances the stretch rod from the retracted position after the preform has exited the oven.

17. The method of pre-stretching a preform according to claim 13, wherein the advancing step advances the stretch rod to the extended position after the preform has exited the oven.

18. The method of pre-stretching a preform according to claim 17, wherein the advancing step advances the stretch rod to the extended position prior to the preform being transferred into the blow molding station.

19. The method of pre-stretching a preform according to claim 13, further comprising the step of at least partially operating the stretch rod while the stretch rod is within the mold cavity.

20. The method of pre-stretching a preform according to claim 13, wherein the retracting step is at least partially performed while the pre-stretched preform is in the blow mold.

21. The method of pre-stretching a preform according to claim 13, wherein the retracting step is at least partially performed while the pre-stretched preform is outside of the blow mold.

22. The method of pre-stretching a preform according to claim 13, wherein the retracting step is at least partially performed during the transferring step.

23. The method of pre-stretching a preform according to claim 13, wherein the retracting step is at least partially performed during the heating step.

* * * * *